(12) United States Patent
Zou et al.

(10) Patent No.: US 7,997,817 B2
(45) Date of Patent: Aug. 16, 2011

(54) PORTABLE TERMINAL WITH KEYPAD LIFTING MECHANISM

(75) Inventors: Zhi-Gang Zou, Shenzhen (CN); Zhi-Gang Peng, Shenzhen (CN); Zhi-Lan Chen, Shenzhen (CN); Tao Yin, Shenzhen (CN); Zhi-Qiang Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 300 days.

(21) Appl. No.: 12/484,320

(22) Filed: Jun. 15, 2009

(65) Prior Publication Data

US 2010/0000845 A1   Jan. 7, 2010

(30) Foreign Application Priority Data

Jul. 3, 2008   (CN) .......................... 2008 1 0302512

(51) Int. Cl.
*G06F 3/023* (2006.01)

(52) U.S. Cl. ...................................... 400/472

(58) Field of Classification Search .................. 400/472, 400/488–490, 480, 481, 713, 714; 455/550.1, 455/566, 90.3, 575.1; 361/679.11–679.16; 379/433.01, 433.04
See application file for complete search history.

(56) References Cited

U.S. PATENT DOCUMENTS

| 5,519,570 | A | * | 5/1996 | Chung | 400/472 |
|---|---|---|---|---|---|
| 5,532,904 | A | * | 7/1996 | Sellers | 400/490 |
| 5,635,928 | A | * | 6/1997 | Takagi et al. | 361/679.13 |
| 5,793,311 | A | * | 8/1998 | Wood | 200/181 |
| 5,933,320 | A | * | 8/1999 | Malhi | 361/679.15 |
| 5,933,812 | A | * | 8/1999 | Meyer et al. | 361/679.26 |
| 5,948,360 | A | * | 9/1999 | Rao et al. | 422/65 |
| 5,971,637 | A | * | 10/1999 | Malhi et al. | 361/679.13 |
| 6,091,600 | A | * | 7/2000 | Jeong | 361/679.12 |
| 6,808,328 | B1 | * | 10/2004 | Gully | 400/472 |
| 6,894,626 | B2 | * | 5/2005 | Olodort et al. | 400/472 |
| 6,991,389 | B2 | * | 1/2006 | Mochizuki et al. | 400/472 |
| 7,286,862 | B2 | * | 10/2007 | Lee et al. | 455/575.4 |
| 2003/0059242 | A1 | * | 3/2003 | Horiuchi et al. | 400/489 |
| 2004/0027335 | A1 | | 2/2004 | Lin | |
| 2004/0126170 | A1 | * | 7/2004 | Hagerman | 400/472 |
| 2005/0245297 | A1 | | 11/2005 | Lee et al. | |
| 2008/0039159 | A1 | * | 2/2008 | Joo et al. | 455/575.4 |
| 2008/0075515 | A1 | * | 3/2008 | Large | 400/472 |
| 2008/0090627 | A1 | * | 4/2008 | Jeong et al. | 455/575.4 |

FOREIGN PATENT DOCUMENTS

| EP | 1638298 A2 | 3/2006 |
|---|---|---|
| WO | 2008074358 A1 | 6/2008 |

\* cited by examiner

*Primary Examiner* — Briggitte R Hammond

(74) *Attorney, Agent, or Firm* — Altis Law Group, Inc.

(57) ABSTRACT

A keypad lifting mechanism includes a first board, a second board and a third board. The second board is positioned between the first board and the third board. The first board has a plurality of wedges. The third board has a plurality of protrusions. The second board has a plurality of resisting members. When the second board is pushed away the first board and the third board, the second board is raised relative to the first board by engagement of the wedges and the resisting member, and the third board is raised relative to the second board by engagement of the resisting members and the protrusions.

20 Claims, 13 Drawing Sheets

PORTABLE TERMINAL WITH KEYPAD LIFTING MECHANISM

This application is related to co-pending U.S. patent application Ser. Nos. 12/483,324 and 12/484,317, all entitled "PORTABLE TERMINAL WITH KEYPAD LIFTING MECHANISM". Such applications have the same assignee as the present application. The above-identified applications are incorporated herein by reference.

BACKGROUND

1. Technical Field

The present disclosure relates to portable terminals, particularly, to a keypad lifting mechanism and a portable terminal therein.

2. Description of Related Art

Sliding-type terminals have recently appeared in electronic devices to satisfy users' various tastes for improved portability and convenience. For example, in mobile phones, a conventional sliding-type terminal has a first housing and a second housing adapted to linearly reciprocate to be opened or closed. A display device is set in one of the housings. A keypad is fixed in the other housing. The keypad is exposed or hidden by sliding of one of the housing. However, with this configuration, the keypad is recessed relative to the sliding housing. Using a recessed keypad while gripping the housing can be uncomfortable and unwieldy.

Therefore, there is room for improvement within the art.

BRIEF DESCRIPTION OF THE DRAWINGS

Many aspects of the keypad lifting mechanism can be better understood with reference to the following drawings. The components in the drawings are not necessarily drawn to scale, the emphasis instead being placed upon clearly illustrating the principles of the keypad lifting mechanism, in which.

DETAILED DESCRIPTION OF THE EMBODIMENTS

Figure 1:
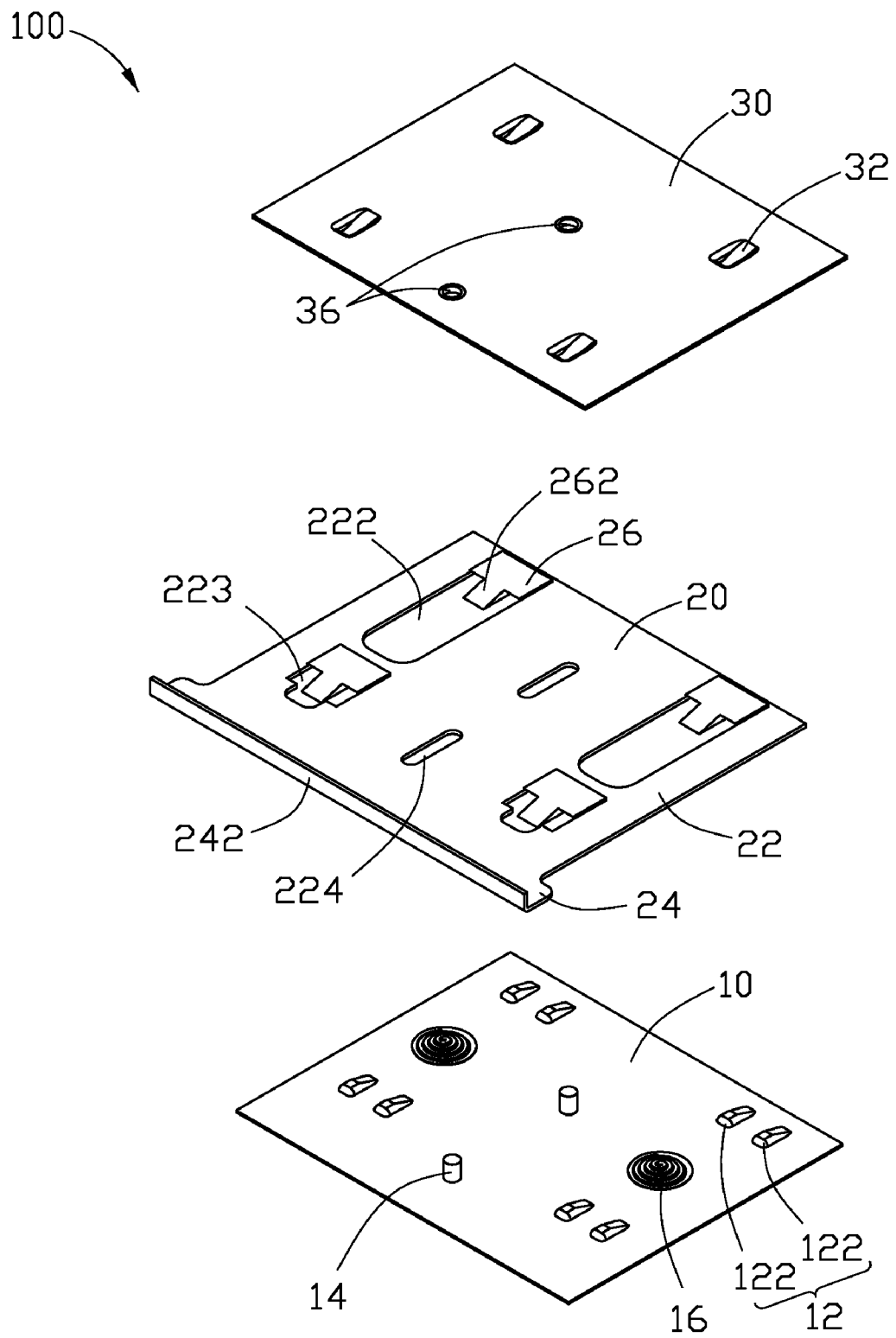
FIG. 1 is an exploded, schematic view of a keypad lifting mechanism, including a third board, a second board, and a first board, in accordance with an exemplary embodiment.

Referring to FIG. 1, a keypad lifting mechanism 100 is applied to a portable terminal 200 (shown in FIG. 8), in accordance with an exemplary embodiment. The keypad lifting mechanism 100 includes a first board 10, a second board 20, and a third board 30.

In this embodiment, the first board 10 may be made of metal. A plurality of guiding posts 14, elastic elements 16, and wedge groups 12 are positioned on a top surface of the first board 10. The elastic elements 16 may be, for example, helical springs. Each wedge group 12 has two parallel wedges 122.

The second board 20 includes a main body 22 and a flange 24. The flange 24 is formed at one end of the main body 22, perpendicular to the main body 22. The main body 22 defines a plurality of first holes 222, second holes 223, and guiding holes 224. The first groove 222 is larger than the second groove 223. The first grooves 222 are configured for allowing the elastic elements to extend therethrough. The guiding holes 224 are configured to slidably receive the corresponding guiding posts 14 therein.

Figure 2:
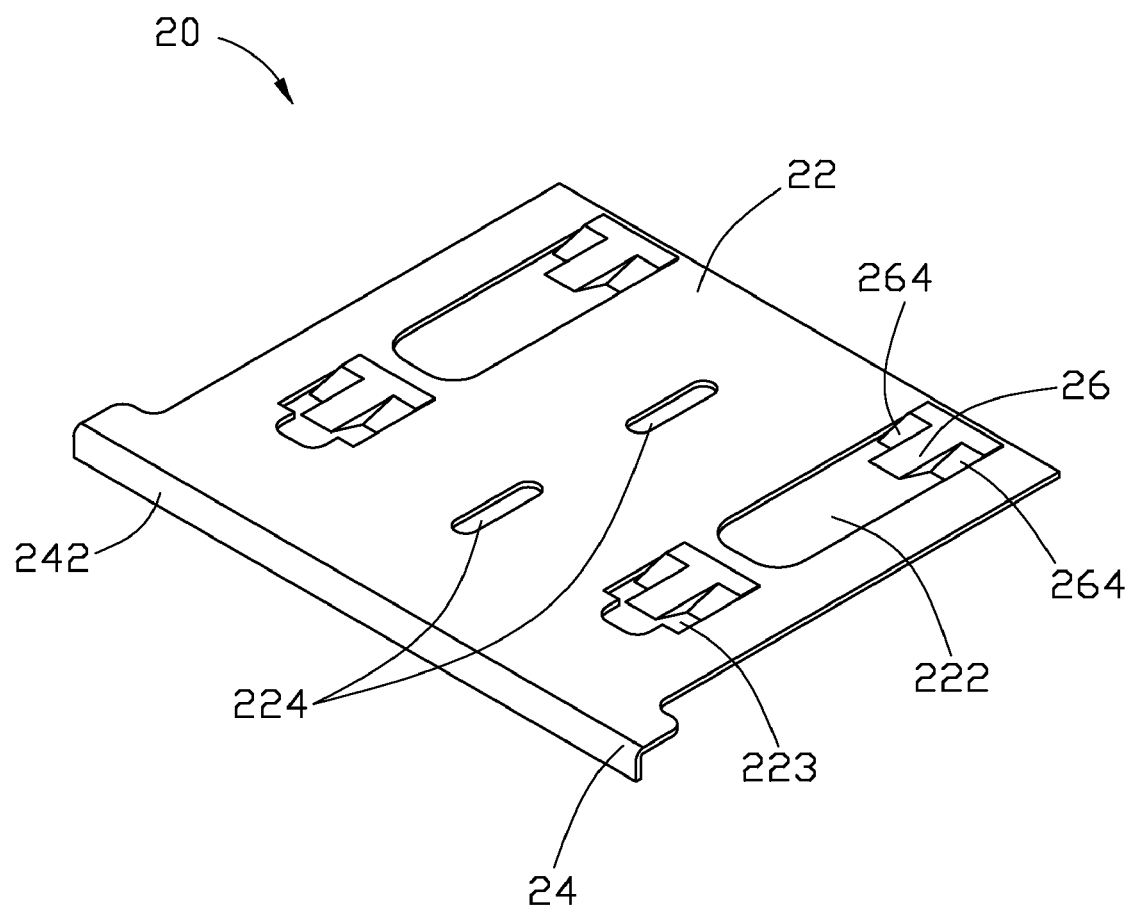
FIG. 2 is a schematic view of the second board shown in FIG. 1.

Also referring to FIG. 2, a plurality of resisting members 26 are formed on the main body 22, respectively received in the grooves 222, 224. Each resisting member 26 has a first slope 262 facing the third board 30 and two second slopes 264 facing the first board 10. The two second slopes 264 are positioned at two sides of the first slope 262 for engaging with the two wedges 122 of a corresponding wedge group 12. The top of each wedge is a horizontal surface.

Figure 3:
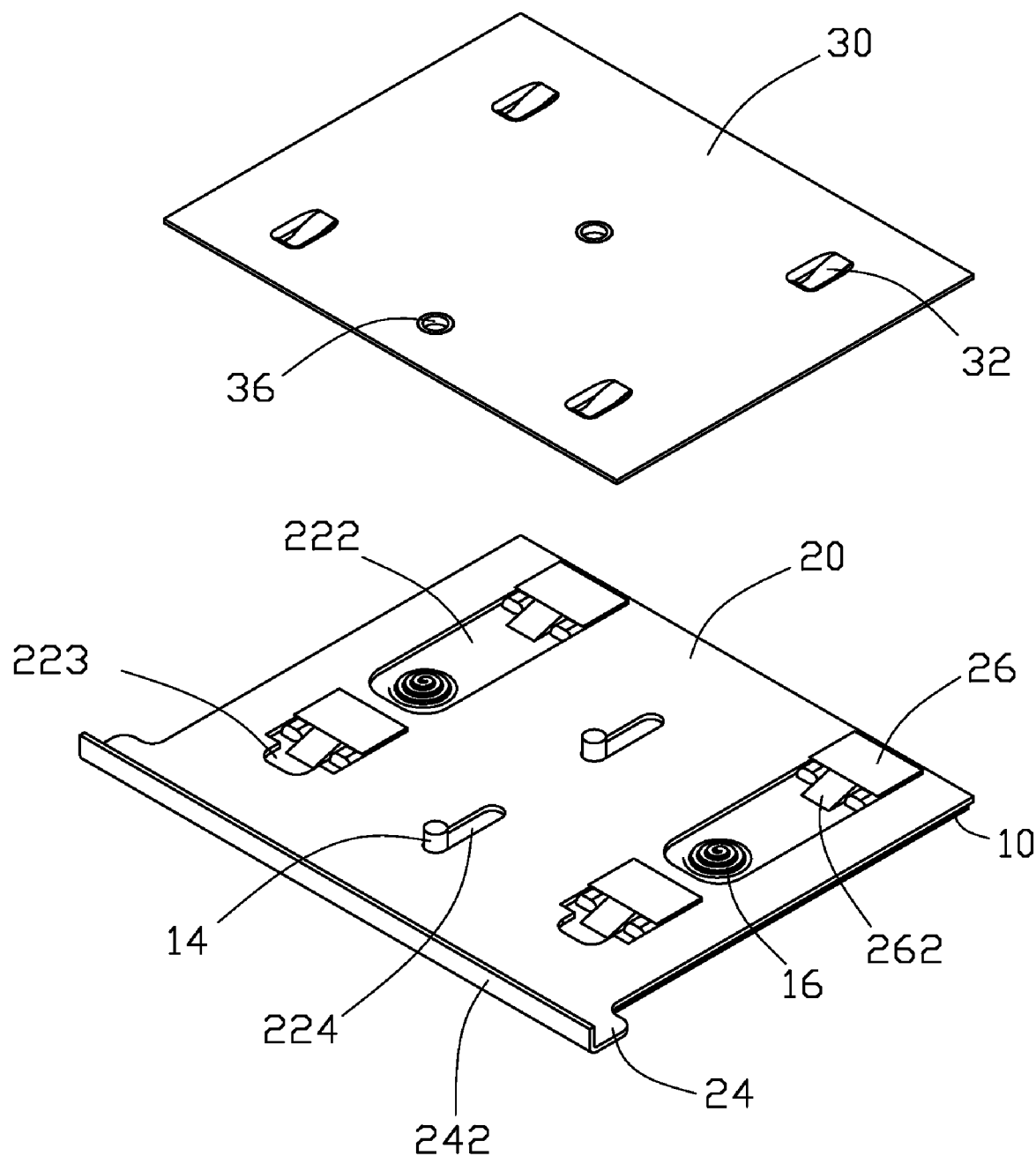
FIG. 3 is an another schematic view of the keypad lifting mechanism shown in FIG. 1, showing the second board attached to the first board.
Figure 4:
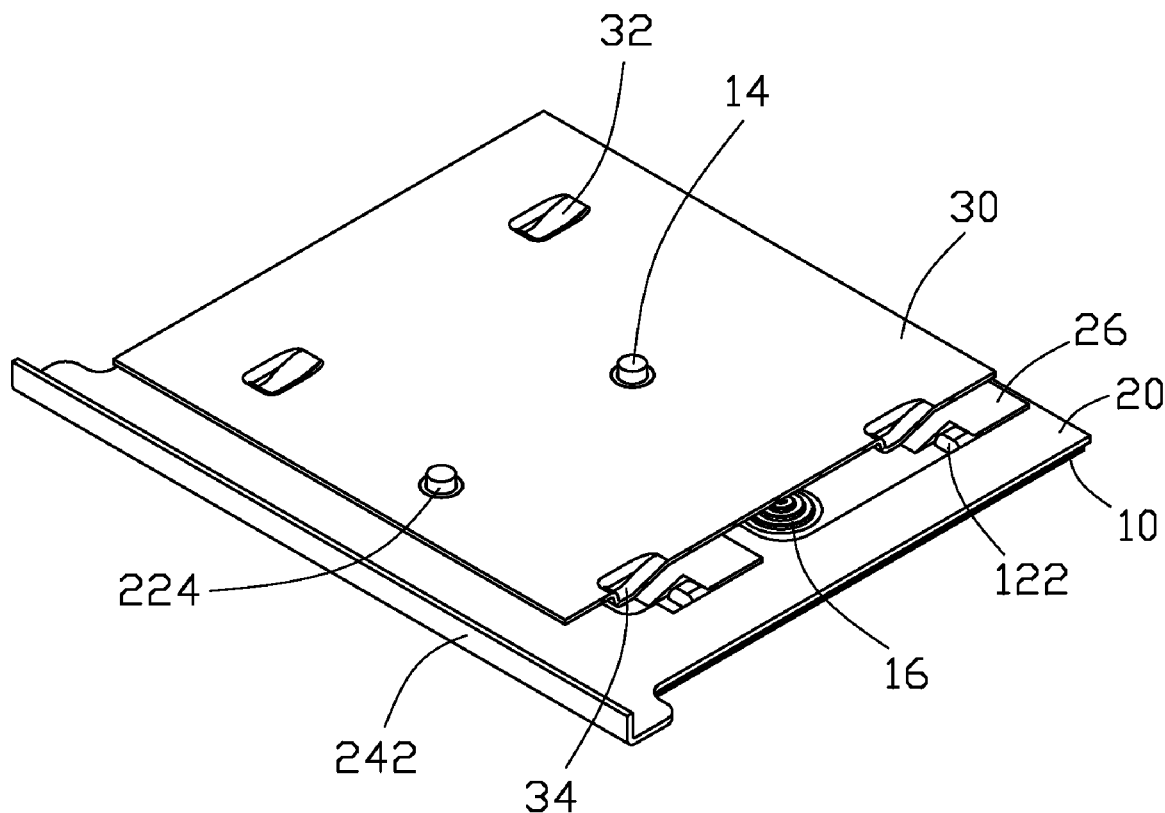
FIG. 4 is an assembled, partially cut-away, schematic view of the keypad lifting mechanism shown in FIG. 1.
Figure 5:
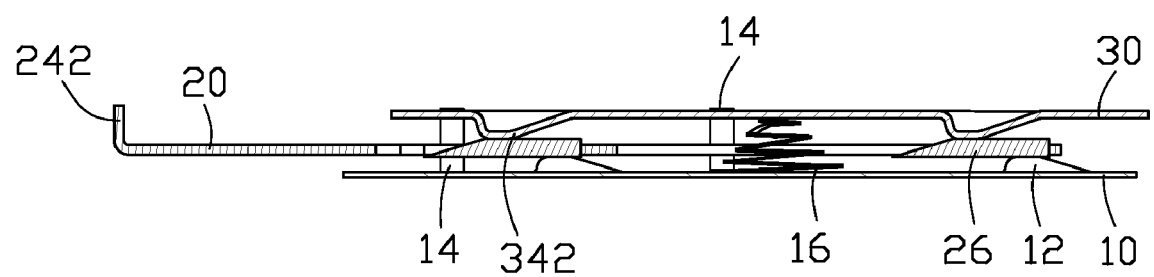
FIG. 5 is a cut-away view of FIG. 1.

Also referring to FIGS. 3-5, the third board 30 has a plurality of recesses 32. The recesses 32 are formed by pressing one side of the third board 30, so that a plurality of corresponding protrusions 34 are formed at another side of the third board 30. Each protrusion 34 has a moderate inclined plane 342 engaging with the first slope 262 of the resisting member 26. The third board 30 defines a plurality of positioning holes 36 for engaging with the guiding posts 14.

When assembling the keypad lifting mechanism 100, the second board 20 is attached to the first board 10. One end of each elastic element 16 is fixed to the first board 10, and another end extends through the corresponding first groove 222 of the second board 20. The wedges 122 respectively match the second slopes 264 of the resisting member 26. The guiding posts 14 respectively pass the guiding holes 224. The third board 30 is then moved toward the second board 20. The end of each elastic element 16 extending through the first groove 222 is fixed to the third board 30. The guiding posts 14 engage in the positioning holes 36. The moderate inclined planes 342 of the protrusions 34 respectively match with the first slopes 262 of the resisting members 26.

In use, the flange 24 of the second board 20 is pushed away from the first board 10, the guiding posts 14 respectively slide along the corresponding guiding hole 224 of the second board. The moderate inclined planes 342 of the protrusions 34 ride up the first slopes 262 of the second board 20 until being situated on level surface connected to upper part of the first slopes 262 of the main body 22. The second slopes 264 of the resisting members 26 respectively slide along the wedges 122 of the first board 10 until being situated on level surfaces of the wedges. Thus, the second board 20 is raised relative to the first board 10, and the third board 30 is raised relative to the second board 20. At the same time, the elastic elements 16 are deformed to force the third board 30 and first board 10 towards each other. However, the top horizontal level surfaces of the main body 22 and the wedges 122 stop the third board 30 and the first board 10 to move toward each other. Thus the third board 30 and the second board 20 can stably remain in their elevated positions without other force.

Figure 6:
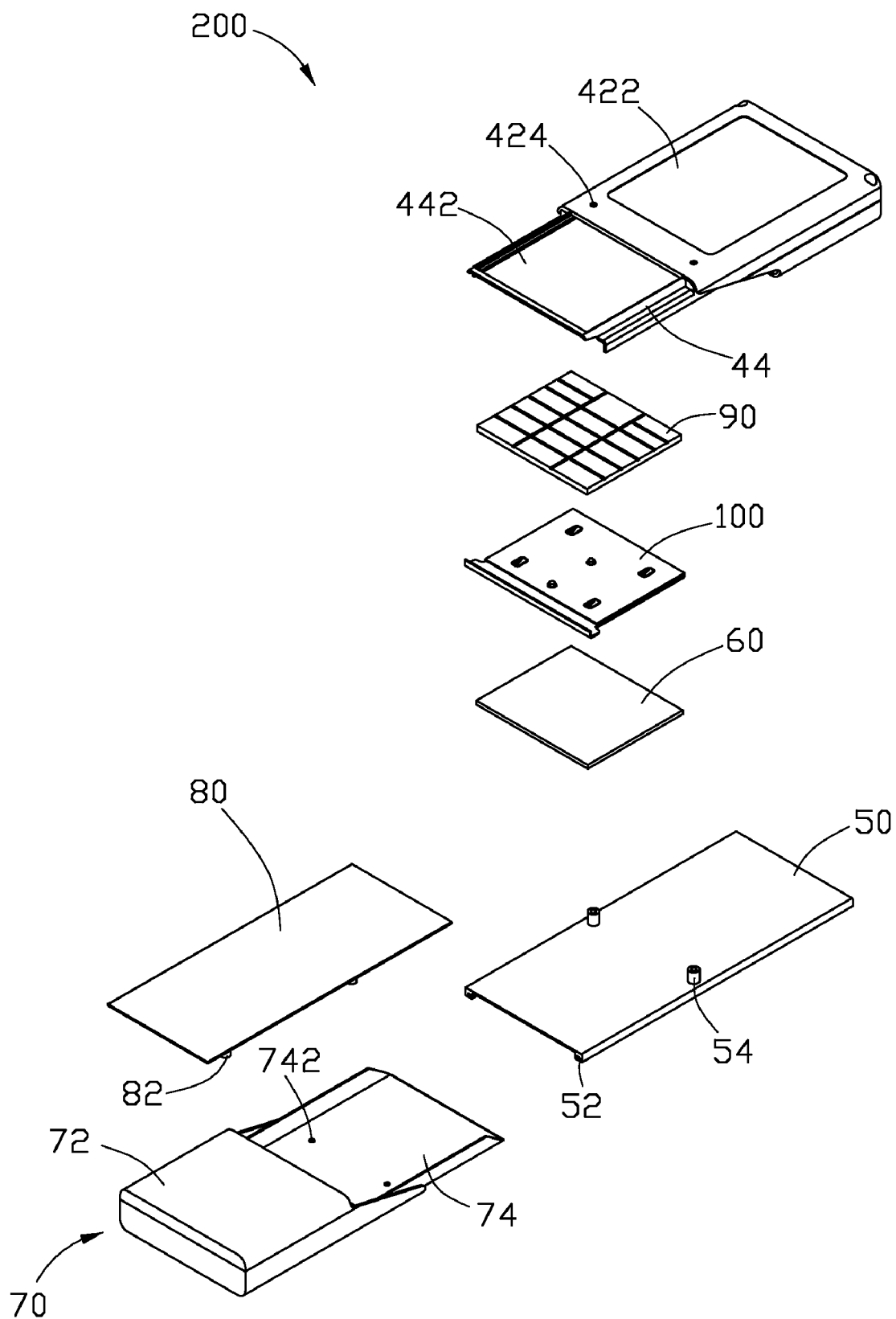
FIG. 6 is an exploded, schematic view of a portable terminal in cooperating with the keypad lifting mechanism shown in FIG. 1, the portable terminal including a first housing, a second housing and a keypad.

Referring to FIG. 6, the portable terminal 200 with the keypad lifting mechanism 100 therein further includes a first housing 40, a sliding board 50, a base board 60, a second housing 70, the fixing board 80 and a keypad 90.

The first housing 40 has a display device 422 and a frame 44. The frame 44 defines a receiving hole 442 for receiving the keypad 90. The first housing 40 defines two first through holes 424 between the display device 422 and the receiving hole 442.

The sliding board 50 is rectangular and has two guiding rails 52 formed at two opposite sides thereof. The guiding rails 52 are L-shaped and extend toward each other. Two first positioning posts 54 are respectively formed adjacent to the guiding rails 52, corresponding to the first through holes 424 of the first housing 40. The two first positioning posts 54 are positioned nearby a center line of the sliding board 50. A screw hole is defined in each first positioning post 54 (not shown).

The base board 60 is connectable to the keypad lifting mechanism 100 and the sliding board 50. The size of the base board 60 is generally similar to the first board 10 of the keypad lifting mechanism 100.

Figure 7:
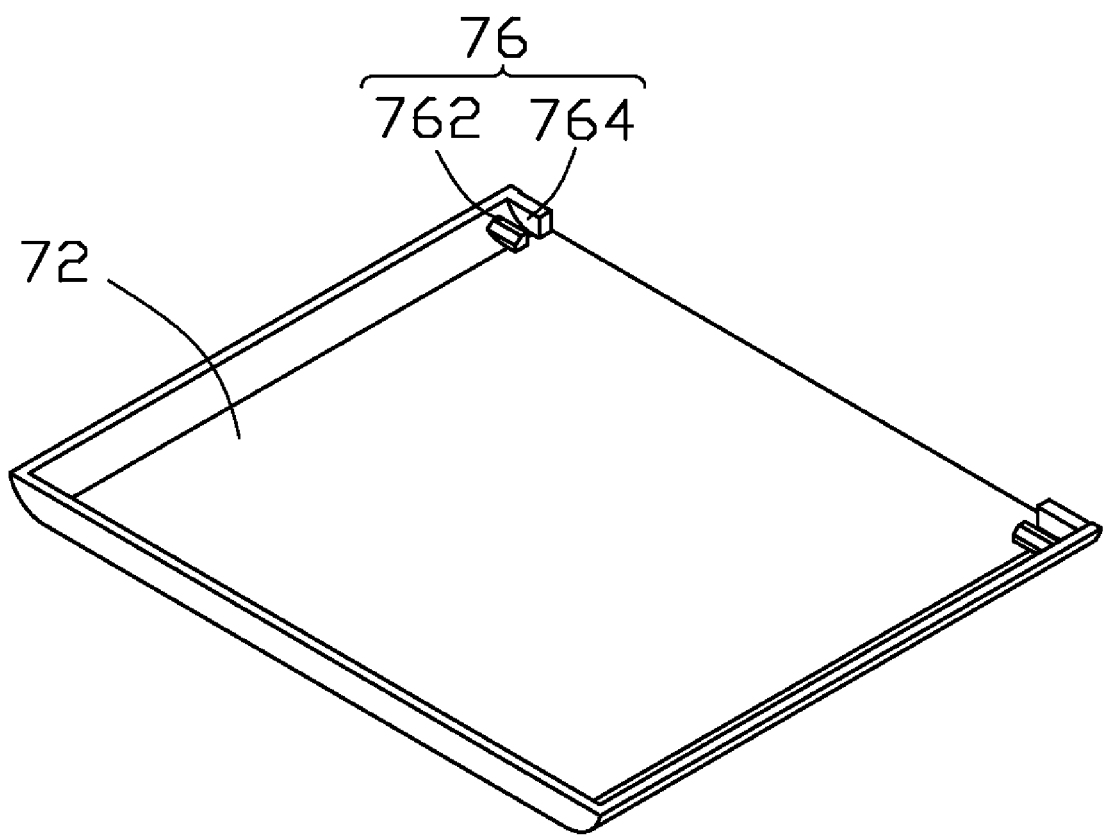
FIG. 7 is a schematic view of a top cover of the second housing shown in FIG. 6.

Also referring to FIG. 7, the second housing 70 includes a top cover 72 and a bottom cover 74. The top cover 72 is disassembly attached to the bottom cover 74. Two stopping portions 76 are formed at one end of the top cover 72. Each stopping portion 76 has a flexible deforming column 762 and a wing 764. The wings 764 are positioned at an edge of the top cover 72. The deforming columns 762 are shorter and lower than the wings 764. Each deforming column 762 has a slope (not labeled) toward another end of the top cover 72, so that the flange 24 of the second board 20 can easily slide over the deforming columns 762 along the slopes. The bottom cover 74 defines a plurality of second through holes 742.

The fixing board 80 has a plurality of second positioning posts 82, corresponding to the second through holes 742. A screw hole (not shown) is defined in each second positioning post 82. The fixing board 80 can be received between the two guiding rails 52 of the sliding board 50, so that the sliding board 50 can be slidable relative to the fixing board 80 along the guiding rails 52.

Figure 8:
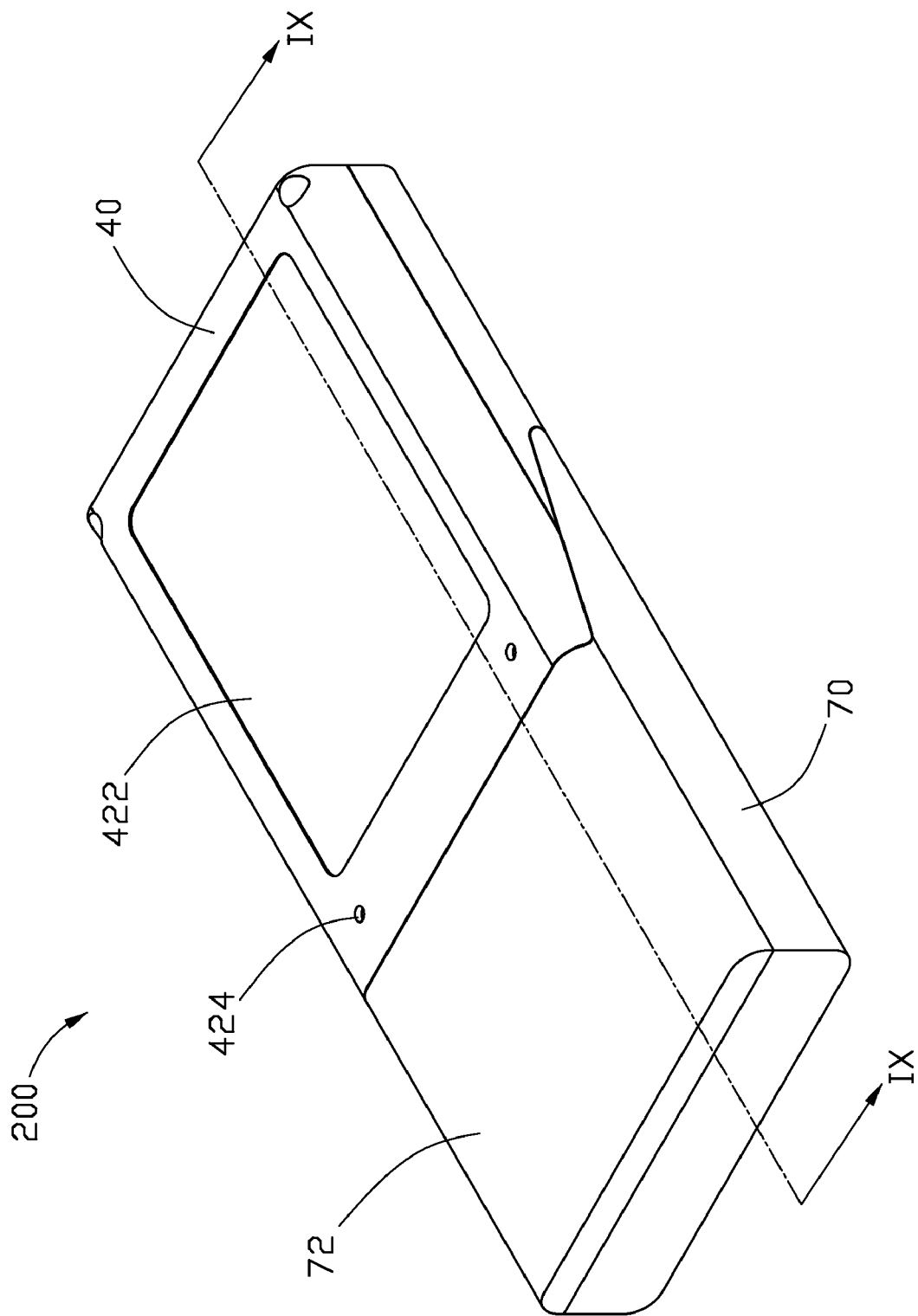
FIG. 8 is an assembled, schematic view of the portable terminal shown in FIG. 6.
Figure 9:
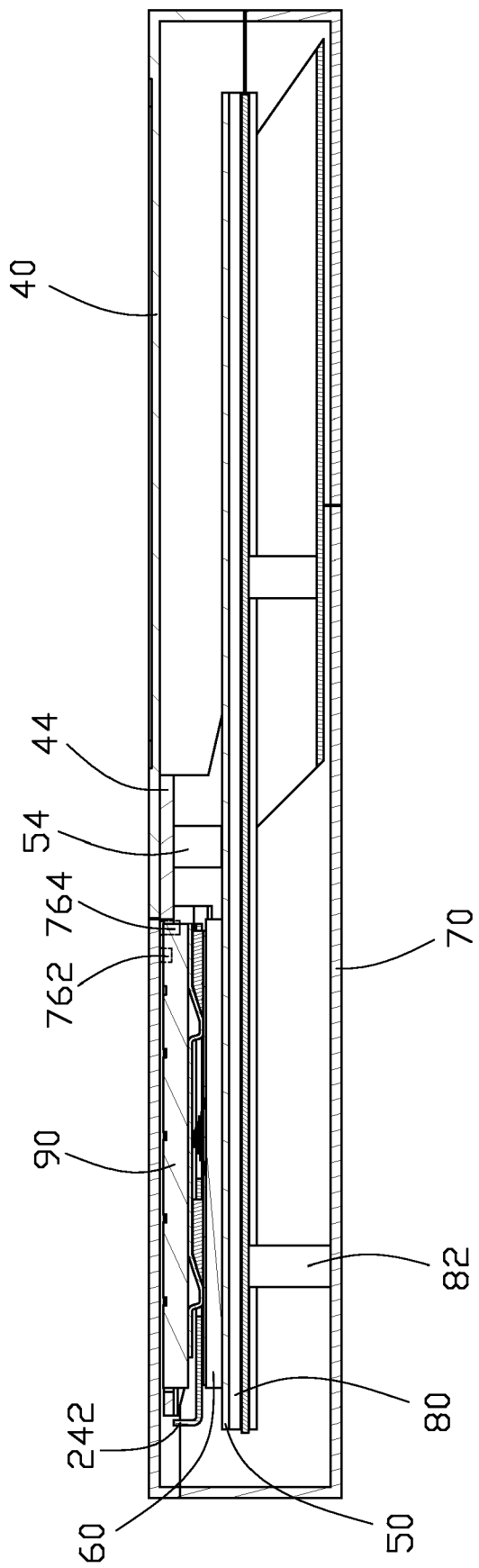
FIG. 9 is a cross-sectional view taken along line IX-IX of FIG. 8.
Figure 10:
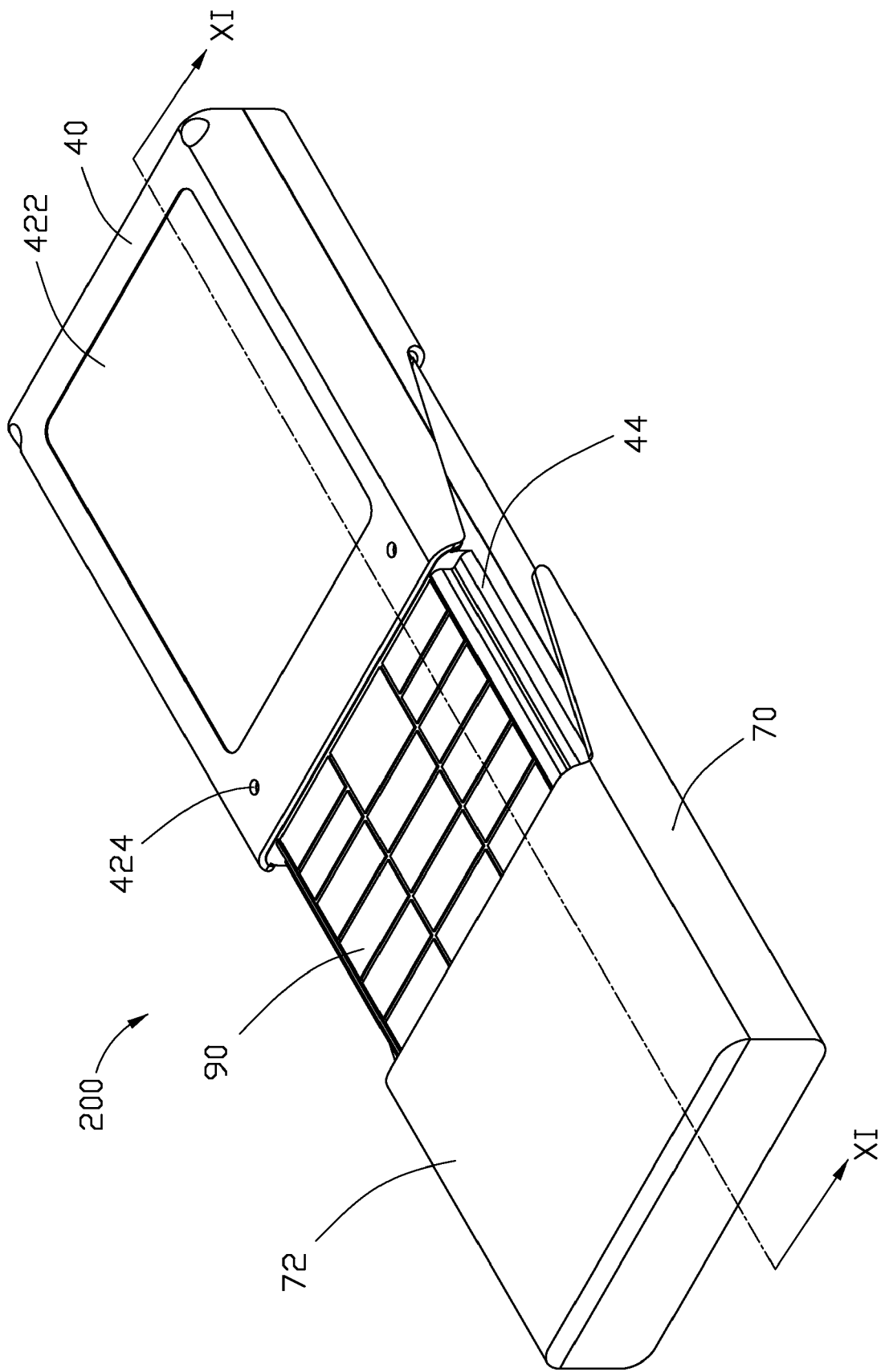
FIG. 10 is an assembled, schematic view of the portable terminal shown in FIG. 6, showing the keypad disclosed.
Figure 11:
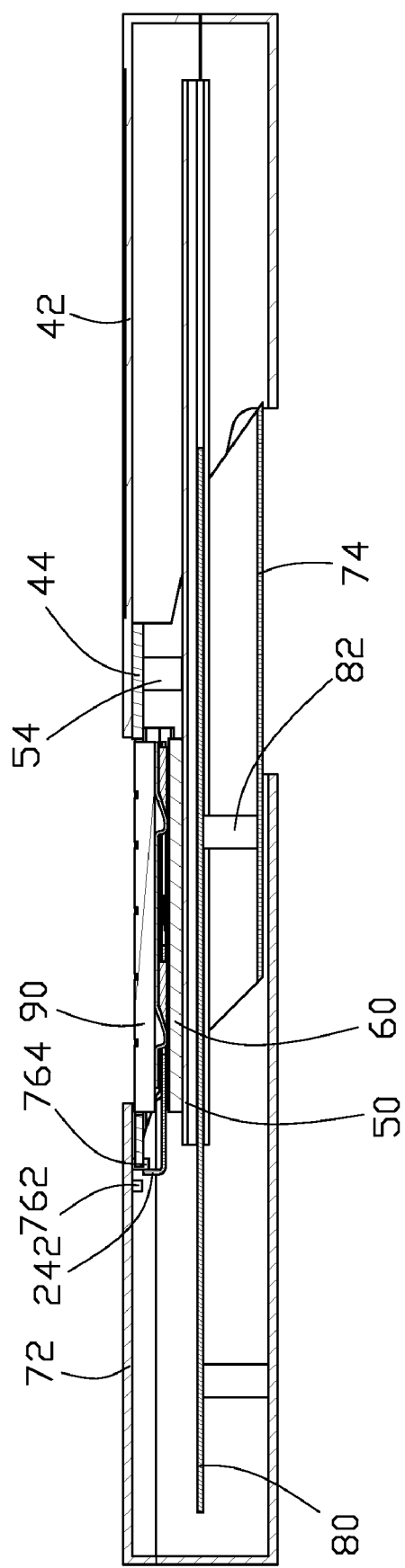
FIG. 11 is a cross-sectional view taken along line XI-XI of FIG. 10.
Figure 12:
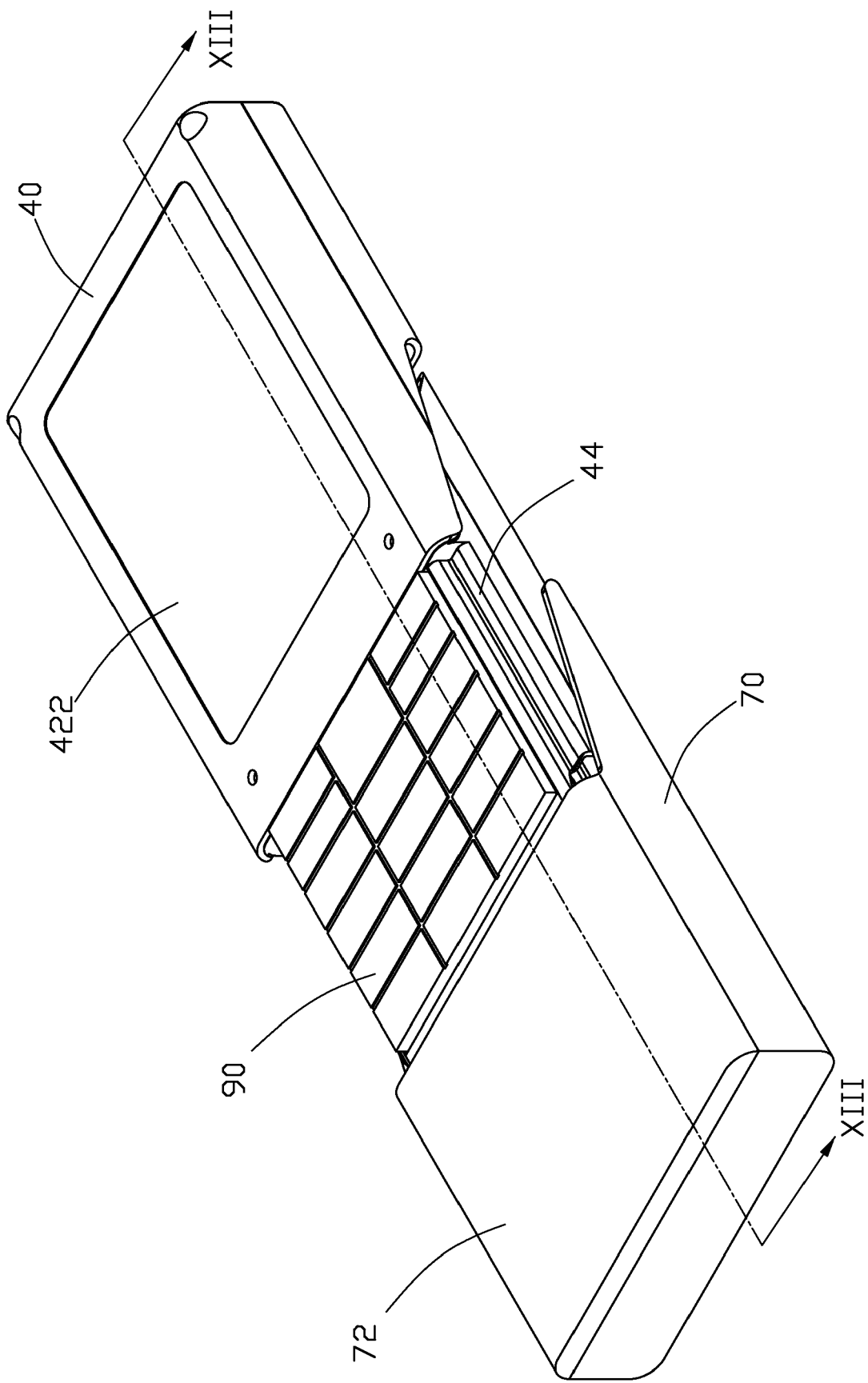
FIG. 12 is similar to FIG. 10, but showing the keypad moved up by the keypad lifting mechanism.
Figure 13:
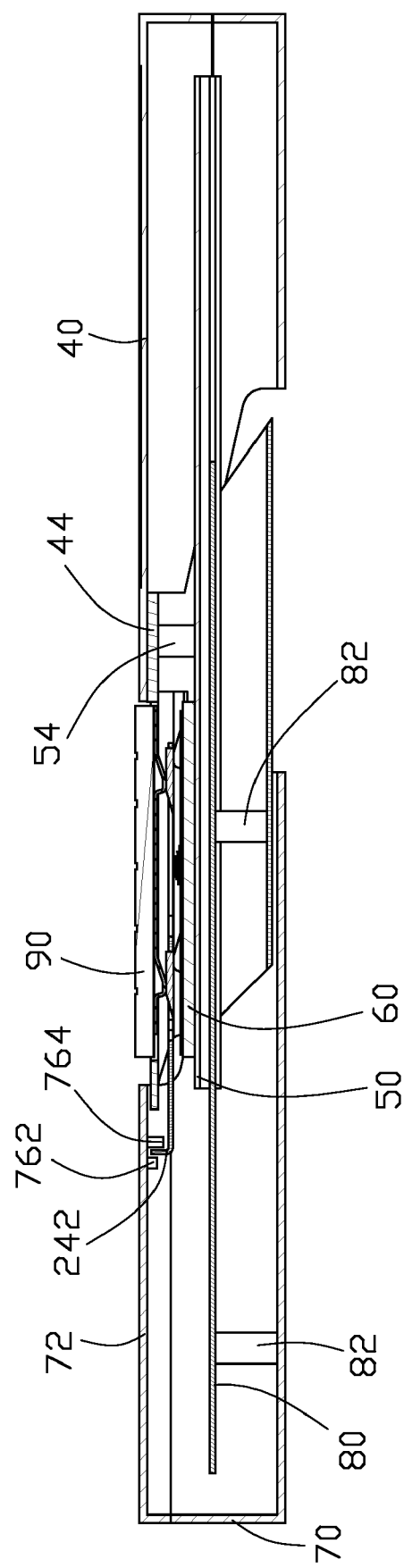
FIG. 13 is a cross-sectional view taken along line XIII-XIII of FIG. 12.

Referring to FIGS. 8-9, in assembly of the portable terminal 200, the keypad 90 is fixed to the third board 30 of the keypad lifting mechanism 100, and the sliding board 50 is fixed to the first board 10 of the keypad lifting mechanism 100. Two screws (not shown) are respectively inserted into the first through holes 424 and then engage in the screw holes of the first housing 40, so as to fix the sliding board 50 to the first housing 40. The keypad 90 is received in the receiving hole 442 of the frame 44.

After that, screws (not shown) are respectively inserted into the second holes and then engage in the screw holes of the fixing board 80, so as to fix the fixing board 80 to the bottom cover 74 of the second housing 70. The fixing board 80 is engaged with the sliding board 50, so that the first housing 40 is slidable relative to the bottom cover 74 along the guiding rails 52 of the sliding board 50. The first housing 40 is pushed toward the bottom cover 74. The top cover 72 is then attached to the bottom cover 74, and the keypad 90 is hidden under the top cover 72. The flange 24 of the keypad lifting mechanism 100 almost touches the top cover 72.

Referring to FIGS. 9-12, when the first housing 40, with the keypad 90 and the keypad lifting mechanism 100, is pushed away from the second housing 70. The keypad 90 is revealed, and the flange 24 of the keypad lifting mechanism 100 reaches the stopping portions 76 of the top cover 72. Since the deforming columns 762 are flexible, the flange 24 comes over the deforming columns 762. The flange 24 is then stopped by the wings 764. Thus the second board 20 stops moving while the third board 30 and the first board 10 further move with the first housing 40. Thus, the moderate inclined planes 342 of the third board 30 moves up along the first slopes 262 of the second board 20, so that the third board 30 is raised relative to the second board 20. At the same time, the second slopes 264 of the second board 20 moves up along the wedges 122 of the first board 10, so that the second board 20 is raised relative to the first board 10. The keypad 90 on the third board 30 is raised to be at a same level as the display device 422. Since the third board 30 moves away from the first board 10, the elastic elements 16 are deformed.

When the first housing 40 is pushed toward the second housing 70, the flange 24 then is stopped by the deforming columns 762. The second board 20 stops moving. The third board 30 and the first board 10 are quickly moved toward the second board 20 by a rebounding force of the elastic elements 16. The flange 24 is then pushed to slide over the deforming columns 762, and the first housing 40 with the keypad 90 further moves until the keypad 90 is wholly hidden under the top cover 72 of the second housing 70.

It is to be understood that the base board 60 may be omitted, and the keypad 90 can be directly fixed to the third board 30 of the keypad lifting mechanism 100.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad lifting mechanism comprising:
    a first board having a plurality of wedges formed thereon;
    a third board having a plurality of protrusions formed thereon; and
    a second board positioned between the first board and the third board, a plurality of resisting members being formed at the second board, the second board being slidable relative to the first board and the third board, when the second board being pushed away from the first board and the third board, the second board being raised relative to the first board by engagement of the wedges and the resisting member, and the third board being raised relative to the second board by engagement of the resisting members and the protrusions.

2. The keypad lifting mechanism as claimed in claim 1, wherein the first board has a plurality of guiding posts formed thereon, the second board defines a plurality of the guiding holes, the third board defines a plurality of positioning holes, the guiding posts respectively pass the guiding holes to engage with the positioning holes, and the guiding posts are slidable relative to the corresponding guiding holes.

3. The keypad lifting mechanism as claimed in claim 1, further comprising a plurality of elastic elements, wherein the second board defines a plurality of through holes, one end of each elastic element is fixed to the first board, and another end passes the corresponding through hole to be fixed to the third board.

4. The keypad lifting mechanism as claimed in claim 3, wherein each of the resisting members comprises a first slope at one side thereof, and each of the protrusions comprises a moderate inclined plane engaging with the inclined plane.

5. The keypad lifting mechanism as claimed in claim 4, wherein each of the resisting members further comprises at least one second slope at another side thereof, and the second slopes are respectively engaged with the corresponding wedges.

6. The keypad lifting mechanism as claimed in claim 5, wherein the number of the at least one second slope is two, and each resisting member corresponds to two wedges.

7. A portable terminal comprising:
a first housing defining a receiving hole;
a second housing including a top cover and a bottom cover, the top cover including at least one stopping portion;
a keypad lifting mechanism including:
    a first board having a plurality of wedges formed thereon;
    a third board having a plurality of protrusions formed thereon; and
    a second board positioned between the first board and the third board, a plurality of resisting members being formed at the second board, the second board being slidable relative to the first board and the third board, the second board being up or down relative to the first board by engagement of the wedges and the resisting member, and the third board being up or down relative to the second board by engagement of the resisting members and the protrusions,
a keypad fixed to the third board of the keypad lifting mechanism, the keypad being received in the receiving hole;
a fixing board fixed to the bottom cover of the second housing;
a sliding board fixed to the first housing, the sliding board being slidably attached to the fixing housing, the first board of the keypad lifting mechanism being fixed to the sliding board;
wherein, the at least one stopping portion of the second housing is configured for stopping the second board of the keypad lifting mechanism moving with the sliding board, so that the third board and the bottom slide relative to the second board, during the keypad being up or down.

8. The portable terminal as claimed in claim 7, wherein the number of the stopping portion is two, each stopping portion includes a deforming column and a wing, the second board has a flange extending from one end thereof, the deforming columns are configured for allowing the flange to come over by giving a force, the wings are configured for stopping the flange.

9. The portable terminal as claimed in claim 8, wherein the deforming columns are elastic and are lower and shorter than the wings.

10. The portable terminal as claimed in claim 7, further comprising a base board, wherein the base board is positioned between the keypad and the third board of the keypad lifting mechanism.

11. The portable terminal as claimed in claim 1, wherein the sliding board has two guiding trails formed at two opposite sides thereof, the two guiding trails are respectively engaged with two edges of the fixing board.

12. The portable terminal as claimed in claim 11, wherein the guiding trails are L-shaped and extend toward each other.

13. The portable terminal as claimed in claim 7, wherein the first board has a plurality of guiding posts formed thereon, the second board defines a plurality of the guiding holes, the third board defines a plurality of positioning holes, the guiding posts respectively pass the guiding holes to engage with the positioning holes, and the guiding posts are slidable relative to the corresponding guiding holes.

14. The portable terminal as claimed in claim 13, further comprising a plurality of elastic elements, wherein the second board defines a plurality of through holes, one end of each elastic element is fixed to the first board, and another end passes the corresponding through hole to be fixed to the third board.

15. The portable terminal as claimed in claim 14, wherein each of the resisting members comprises a first slope at one side thereof, and each of the protrusions comprises a moderate inclined plane engaging with the inclined plane.

16. The portable terminal as claimed in claim 15, wherein each of the resisting members further comprises at least one second slope at another side thereof, and the second slopes are respectively engaged with the corresponding wedges.

17. The portable terminal as claimed in claim 16, wherein the number of the at least one second slope is two, and each resisting member corresponds to two wedges.

18. A portable terminal comprising:
a first housing defining a receiving hole;
a second housing;
a keypad received in the receiving hole;
a fixing board fixed to the second housing;
a sliding board fixed to the first housing, the sliding board being slidably attached to the fixing board; and
a keypad lifting mechanism, the keypad being fixed on the keypad lifting mechanism, the bottom of the keypad lifting mechanism being fixed to the sliding board, the keypad being moved up or down by the keypad lifting mechanism when the first housing sliding relative to the second housing.

19. The portable terminal as claimed in claim 18, wherein the keypad lifting mechanism includes a third board, a second board and a first board, the keypad is fixed on the third board, and the first board is fixed to the sliding board.

20. The portable terminal as claimed in claim 19, wherein the first board has a plurality of wedges, the third board has a plurality of protrusions, the second board has a plurality of resisting members, the second board being up or down relative to the first board by engagement of the wedges and the resisting member, and the third board being up or down relative to the second board by engagement of the resisting members and the protrusions.

* * * * *